US012664180B2

(12) United States Patent
Gunda et al.

(10) Patent No.: US 12,664,180 B2
(45) Date of Patent: Jun. 23, 2026

(54) SELF-ADAPTIVE REPLICATION FOR DIGITAL DATA STORAGE

(71) Applicant: Dell Products, L.P., Round Rock, TX (US)

(72) Inventors: Kalyan C. Gunda, Shrewsbury, MA (US); Zongque Xu, Shanghai (CN); Chuan Wang, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 5 days.

(21) Appl. No.: 18/768,160

(22) Filed: Jul. 10, 2024

(65) Prior Publication Data

US 2026/0017283 A1     Jan. 15, 2026

(51) Int. Cl.
*G06F 16/27*          (2019.01)

(52) U.S. Cl.
CPC ............ *G06F 16/275* (2019.01); *G06F 16/27* (2019.01); *G06F 16/273* (2019.01)

(58) Field of Classification Search
CPC ............... G06F 11/1484; G06F 11/203; G06F 11/2074; G06F 11/2076; G06F 11/2094; G06F 11/2097; G06F 16/27; G06F 16/273; G06F 16/275; G06F 2009/4557; G06F 2009/45591; G06F 2201/81; G06F 2201/815; G06F 2201/82; G06F 9/45558; G06F 3/0611; G06F 3/0619; G06F 3/0634; G06F 3/065; G06F 3/0653; G06F 3/0683
See application file for complete search history.

(56) References Cited

U.S. PATENT DOCUMENTS 11,068,191 B2 *  7/2021  Chen ..................... G06F 3/0611
2021/0382797 A1 * 12/2021  Tatiparthi ............. G06F 11/203

* cited by examiner

*Primary Examiner* — Marcin R Filipczyk
(74) *Attorney, Agent, or Firm* — Amin, Turocy & Watson, LLP

(57)          ABSTRACT

The described technology is generally directed towards automatic storage of data/digital objects in a self-adaptive replication system. Data replication can be switched between synchronous (sync) replication and asynchronous (async) replication between a local storage system and a remote storage system. Latency between writing data to the local storage system and the remote storage system can be determined. In the event of the latency is less than a threshold value, sync replication can be utilized, and in the event of the latent is greater than the threshold value, async replication can be utilized. Accordingly, data replication can adapt based on infrastructure, volume of data to be write, period(s) of no-data writes, etc. Async replication can use a buffer to temporarily store data during a write operation at the remote storage system. Alternatively, a list can be maintained for data to write to the remote storage system for subsequent replication.

20 Claims, 11 Drawing Sheets

1000

PASS THROUGH OPERATION

SWITCH 115 IN FIRST POSITION
= SYNC-MODE REPLICATION

100C

SWITCH 115 IN SECOND POSITION =
ASYNC-MODE REPLICATION

100D

COMP.
SYS. 180A

PROCESS
COMP. 193

PROC.'S
194A-n

DATA
104A-n

160

SLA
128A-n

RCS 110

THRES.
*H*

HANDLER
COMP. 112

COMMS
197A-n

MONITOR
COMP. 114

RPO
140A-n

DATA
105A-n
(VOL
106A-n)

ID
177A-n

LIST
176A-n

BACKLOG
RECORDER
170

RSS 130

RC 131

T2

LSS 120

LATENCY

LC 121

T1

PASS THROUGH OPERATION

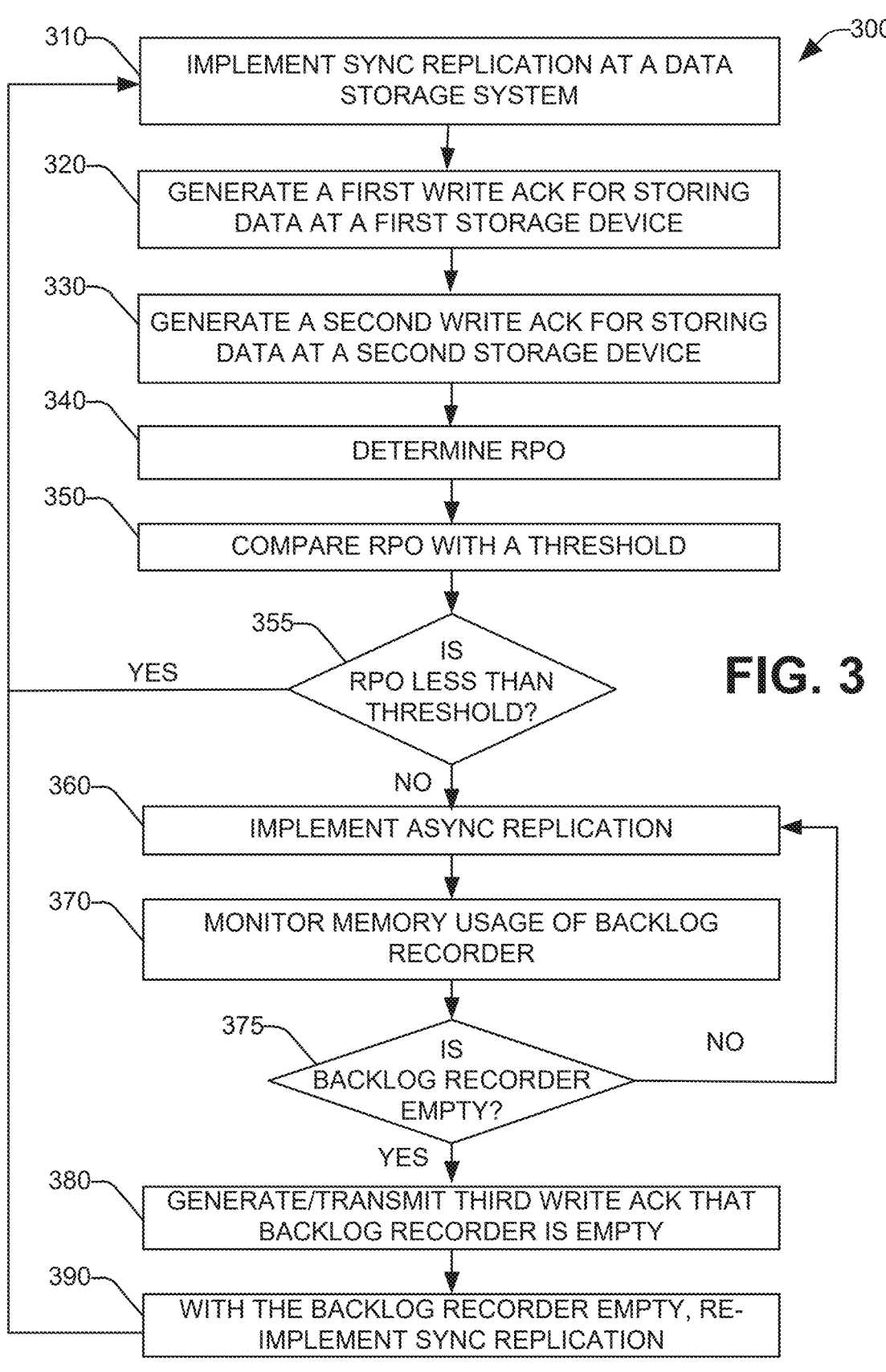

310 — IMPLEMENT SYNC REPLICATION AT A DATA STORAGE SYSTEM

320 — GENERATE A FIRST WRITE ACK FOR STORING DATA AT A FIRST STORAGE DEVICE

330 — GENERATE A SECOND WRITE ACK FOR STORING DATA AT A SECOND STORAGE DEVICE

340 — DETERMINE RPO

350 — COMPARE RPO WITH A THRESHOLD

355 — IS RPO LESS THAN THRESHOLD?

YES

NO

360 — IMPLEMENT ASYNC REPLICATION

370 — MONITOR MEMORY USAGE OF BACKLOG RECORDER

375 — IS BACKLOG RECORDER EMPTY?

NO

YES

380 — GENERATE/TRANSMIT THIRD WRITE ACK THAT BACKLOG RECORDER IS EMPTY

390 — WITH THE BACKLOG RECORDER EMPTY, RE-IMPLEMENT SYNC REPLICATION

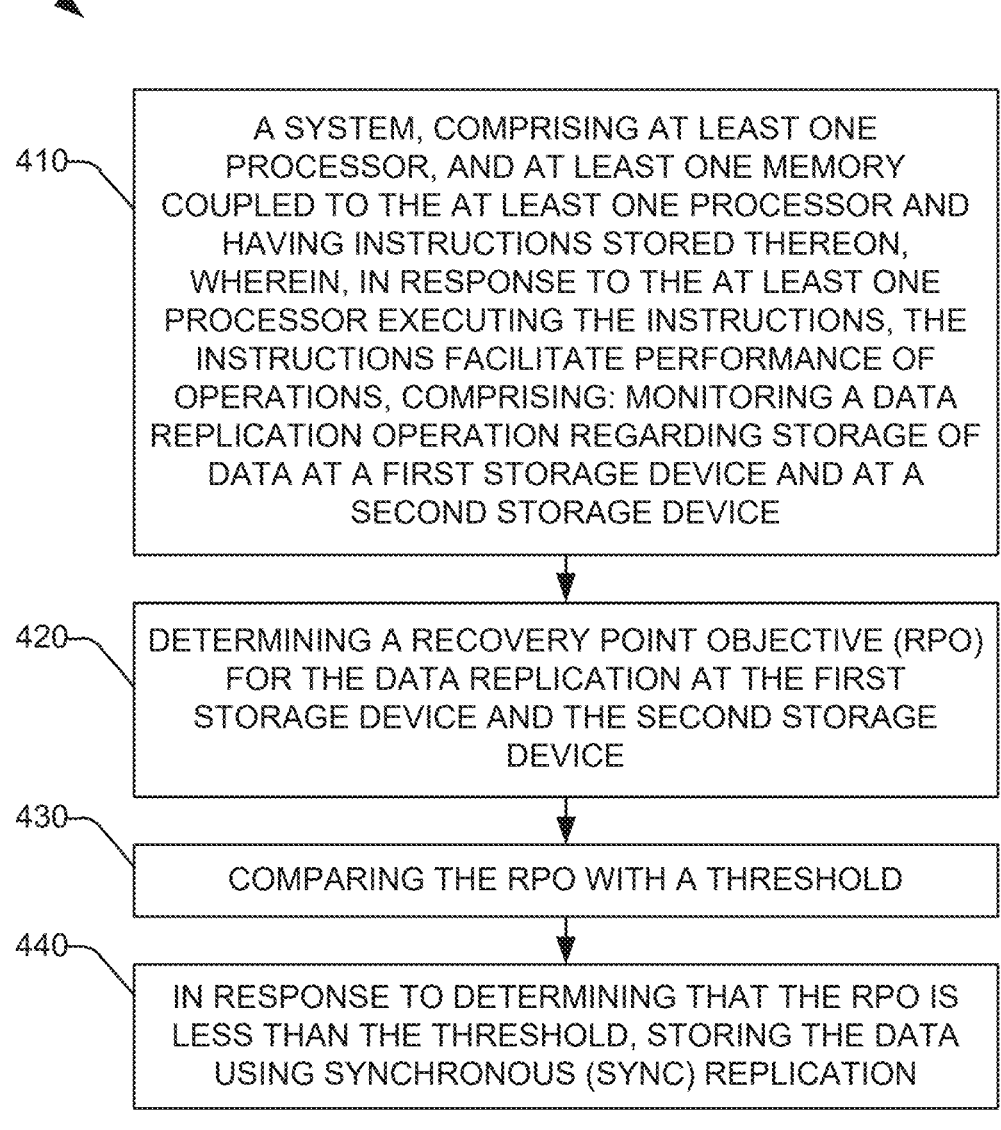

410 — A SYSTEM, COMPRISING AT LEAST ONE PROCESSOR, AND AT LEAST ONE MEMORY COUPLED TO THE AT LEAST ONE PROCESSOR AND HAVING INSTRUCTIONS STORED THEREON, WHEREIN, IN RESPONSE TO THE AT LEAST ONE PROCESSOR EXECUTING THE INSTRUCTIONS, THE INSTRUCTIONS FACILITATE PERFORMANCE OF OPERATIONS, COMPRISING: MONITORING A DATA REPLICATION OPERATION REGARDING STORAGE OF DATA AT A FIRST STORAGE DEVICE AND AT A SECOND STORAGE DEVICE

420 — DETERMINING A RECOVERY POINT OBJECTIVE (RPO) FOR THE DATA REPLICATION AT THE FIRST STORAGE DEVICE AND THE SECOND STORAGE DEVICE

430 — COMPARING THE RPO WITH A THRESHOLD

440 — IN RESPONSE TO DETERMINING THAT THE RPO IS LESS THAN THE THRESHOLD, STORING THE DATA USING SYNCHRONOUS (SYNC) REPLICATION

FIG. 4

500

510

COMPARING, BY A DEVICE COMPRISING AT LEAST ONE PROCESSER, A RECOVERY POINT OBJECTIVE (RPO) VALUE OF A DATA REPLICATION SYSTEM WITH A THRESHOLD VALUE, WHEREIN THE DATA REPLICATION SYSTEM IS INITIALLY OPERATING IN A SYNCHRONOUS (SYNC)-REPLICATION MODE, AND WHEREIN FIRST DATA IS BEING WRITTEN CONCURRENTLY TO A FIRST DATA STORAGE SYSTEM AND A SECOND DATA STORAGE SYSTEM

520

IN RESPONSE TO DETERMINING THAT THE RPO VALUE EQUALS OR EXCEEDS THE THRESHOLD VALUE, IMPLEMENTING, BY THE DEVICE, ASYNCHRONOUS (ASYNC)-MODE REPLICATION TO STORE SECOND DATA TO THE FIRST DATA STORAGE SYSTEM AND THE SECOND DATA STORAGE SYSTEM

FIG. 5

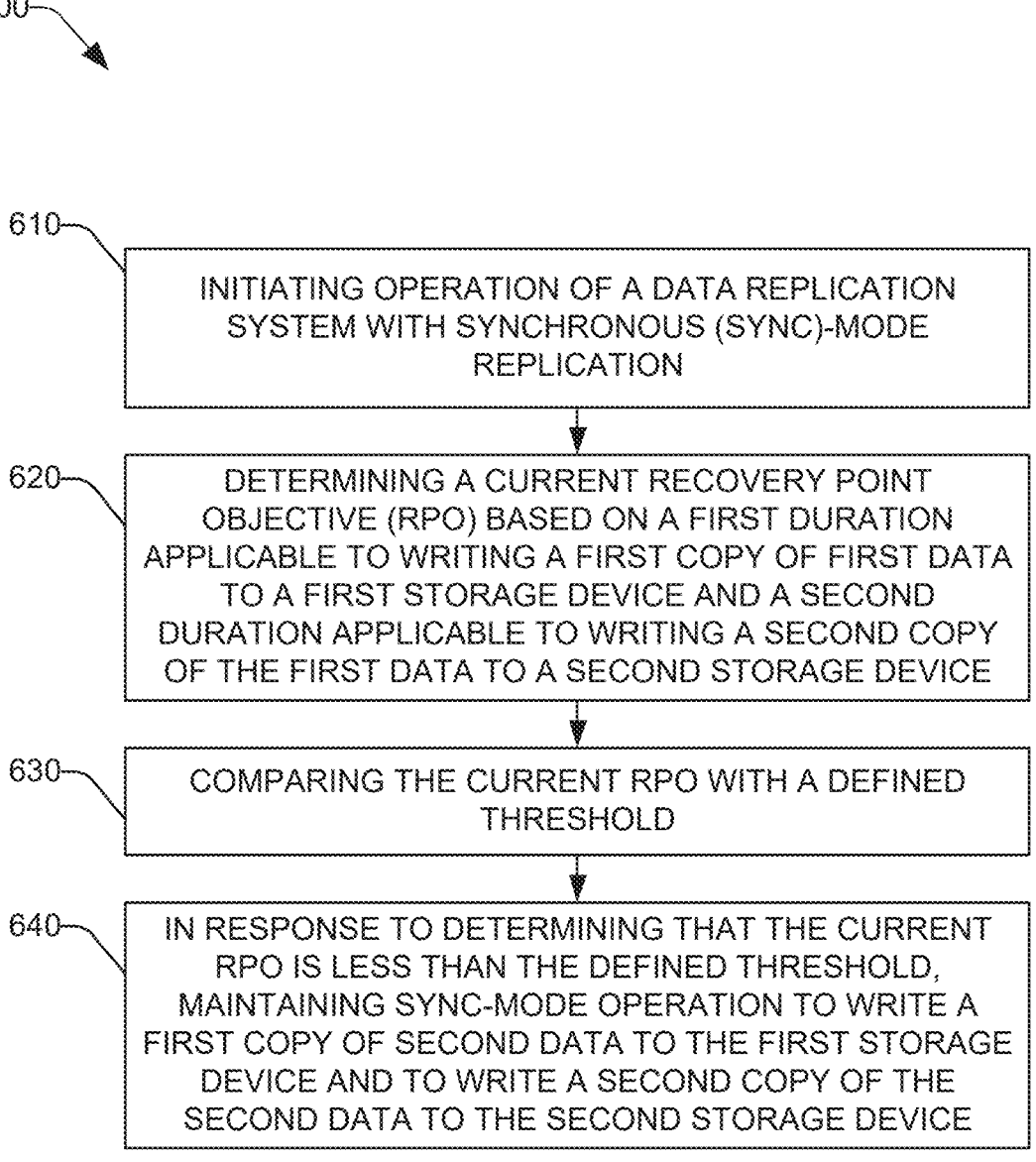

600

610

INITIATING OPERATION OF A DATA REPLICATION SYSTEM WITH SYNCHRONOUS (SYNC)-MODE REPLICATION

620

DETERMINING A CURRENT RECOVERY POINT OBJECTIVE (RPO) BASED ON A FIRST DURATION APPLICABLE TO WRITING A FIRST COPY OF FIRST DATA TO A FIRST STORAGE DEVICE AND A SECOND DURATION APPLICABLE TO WRITING A SECOND COPY OF THE FIRST DATA TO A SECOND STORAGE DEVICE

630

COMPARING THE CURRENT RPO WITH A DEFINED THRESHOLD

640

IN RESPONSE TO DETERMINING THAT THE CURRENT RPO IS LESS THAN THE DEFINED THRESHOLD, MAINTAINING SYNC-MODE OPERATION TO WRITE A FIRST COPY OF SECOND DATA TO THE FIRST STORAGE DEVICE AND TO WRITE A SECOND COPY OF THE SECOND DATA TO THE SECOND STORAGE DEVICE

FIG. 6

SELF-ADAPTIVE REPLICATION FOR DIGITAL DATA STORAGE

BACKGROUND

Data replication is a process for creating and storing multiple copies of data in different locations, e.g., as part of a data protection/disaster recovery process. Two approaches to storing data are available: (a) synchronous (sync) replication, where data is written to/stored concurrently at a local storage system and a remote storage system, and (b) asynchronous (async) replication, where data is first written to the local storage system and then to the remote storage system. Sync replication is preferred but can be difficult to achieve given issues regarding data transmission, network bandwidth, network latency, etc.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to automatically implement sync-mode replication and async-mode replication at a data storage system.

According to one or more embodiments, a data replication system is presented, wherein the data replication system comprises at least one processor, and at least one memory coupled to the at least one processor and having instructions stored thereon, wherein the data replication system can be configured to automatically control storage of data. In response to the at least one processor executing the instructions, the instructions facilitate performance of operations, comprising: monitoring a data replication operation regarding storage of data at a first storage device and at a second storage device, and determining a recovery point objective (RPO) for the data replication at the first storage device and the second storage device. The operations can further comprise comparing the RPO with a threshold, and further, in response to determining that the RPO is less than the threshold, storing the data using synchronous (sync) replication.

In another embodiment, the operations can further comprise, in response to determining that the RPO is equal to, or greater than, the threshold, storing the data using asynchronous (async) replication.

In a further embodiment, the operations can further comprise, in response to a subsequent determination that the RPO is less than the threshold, re-implementing the sync replication.

In an embodiment, the data is a first data, and the async replication utilizes a buffer between the first storage device and the second storage device, and wherein the buffer is utilized to store second data concurrently with the first data being written to the second storage device.

In another embodiment, the sync replication can utilize a first network path between the first storage device and the second storage device, and wherein the async replication can utilize a second network path between the first storage device and the second storage device.

In an embodiment, the threshold can be determined as a function of a time defined in a service level agreement applicable to the data replication system.

In another embodiment, the operations can further comprise (a) identifying a future volume of data to be stored by the data replication system at a future time, (b) determining a future threshold implement sync-mode operation of the data replication system, and (c) at the future time, applying the future threshold to store the future volume of data with sync-mode replication. The operations can further comprise determining the RPO as a function of a time difference between writing a first copy of first data to the first storage device and writing a second copy of the first data to the second storage device.

In an embodiment, the first storage device can be located local to the data replication system and the second storge device can be located remote from the data replication system. In another embodiment, the first storage device and the second storage device can be included in a storage area network, a local area network, local wide area network, or a cloud-based computing network.

In further embodiments, a computer-implemented method is provided, wherein the method comprises comparing, by a device comprising at least one processer, a recovery point objective (RPO) value of a data replication system with a threshold value, wherein the data replication system is initially operating in a synchronous (sync)-replication mode, and wherein first data is being written concurrently to a first data storage system and a second data storage system. The method can further comprise, in response to determining that the RPO value equals or exceeds the threshold value, implementing, by the device, asynchronous (async)-mode replication to store second data to the first data storage system and the second data storage system. In an embodiment, the first data storage system can be located local to the device and the second data storage system can be located remote from the device.

In another embodiment, writing a first copy of first data to the local device requires at least a first duration and writing a second copy of the first data to the remotely located device requires at least a second duration, and wherein the RPO value can be a function of a difference between the first duration and the second duration.

In a further embodiment, the method can further comprise in response to subsequently determining that the RPO value has become less than the threshold value, implementing, by the device, the sync-mode replication to store a first copy of second data to the first data storage system and to store a second copy of the second data to the second data storage system.

In a further embodiment of the method, during sync-mode replication, data can be written directly to the second storage device, and during async-mode replication, data can be temporarily stored in a buffer to address write latency between the first storage device and the second storage device, as a result of which a first write operation to the first storage device is unimpeded by a second write operation to the second storage device.

Further embodiments can include a computer program product stored on a non-transitory computer-readable medium and comprising machine-executable instructions, wherein in response to being executed, the machine-executable instructions cause a system to perform operations, comprising initiating operation of a data replication system with synchronous (sync)-mode replication and further determining a current recovery point objective (RPO) based on a first duration applicable to writing a first copy of first data to a first storage device and a second duration applicable to writing a second copy of the first data to a second storage device. In an embodiment, the operations can further comprise comparing the current RPO with a defined threshold, and further, in response to determining that the current RPO is less than the defined threshold, maintaining sync-mode operation to write a first copy of second data to the first storage device and to write a second copy of the second data to the second storage device.

In an embodiment, the defined threshold can be determined based on a percentage of a customer-defined value in a service level agreement received at the data replication system.

In another embodiment, the operations can further comprise, in response to determining the current RPO is equal to, or above, the defined threshold, implementing asynchronous (async)-mode operation to write a first copy of third data to the first storage device and to write a second copy of the third data to the second storage device.

In a further embodiment, a first transmission of the first copy of first data to a first storage device can be via a first network path, and a second transmission of the second copy of the first data to a second storage device can be via a second network path. In an embodiment, the second network path can comprise a buffer device configured to buffer data to be written to the second storage device while the data is written to the first storage device.

In another embodiment, during async-mode operation, (a) a list can be generated comprising a list of data awaiting replication at the second storage device where the list details that the second copy of the second data has been written to the first storage device but not the second storage device, (b) adding the second copy of the second data to the list, (c) monitor operation of the second storage device; and (d) in response to determining no write operation is currently being performed at the second storage device, (e) identifying the second copy of the second data present in the list, (f) retrieving the second copy of the second data from the first storage device, and (g) writing the second copy of the second data to the second storage device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 presents an example computer-implemented method for self-adaptive replication of a data storage system, in accordance with one or more embodiments.

FIG. 4 presents an example computer-implemented method for self-adaptive replication of a data storage system, in accordance with one or more embodiments.

FIG. 5 presents an example computer-implemented method for self-adaptive replication of a data storage system, in accordance with one or more embodiments.

FIG. 6 presents an example computer-implemented method for self-adaptive replication of a data storage system, in accordance with one or more embodiments.

DETAILED DESCRIPTION

Figure 1A:
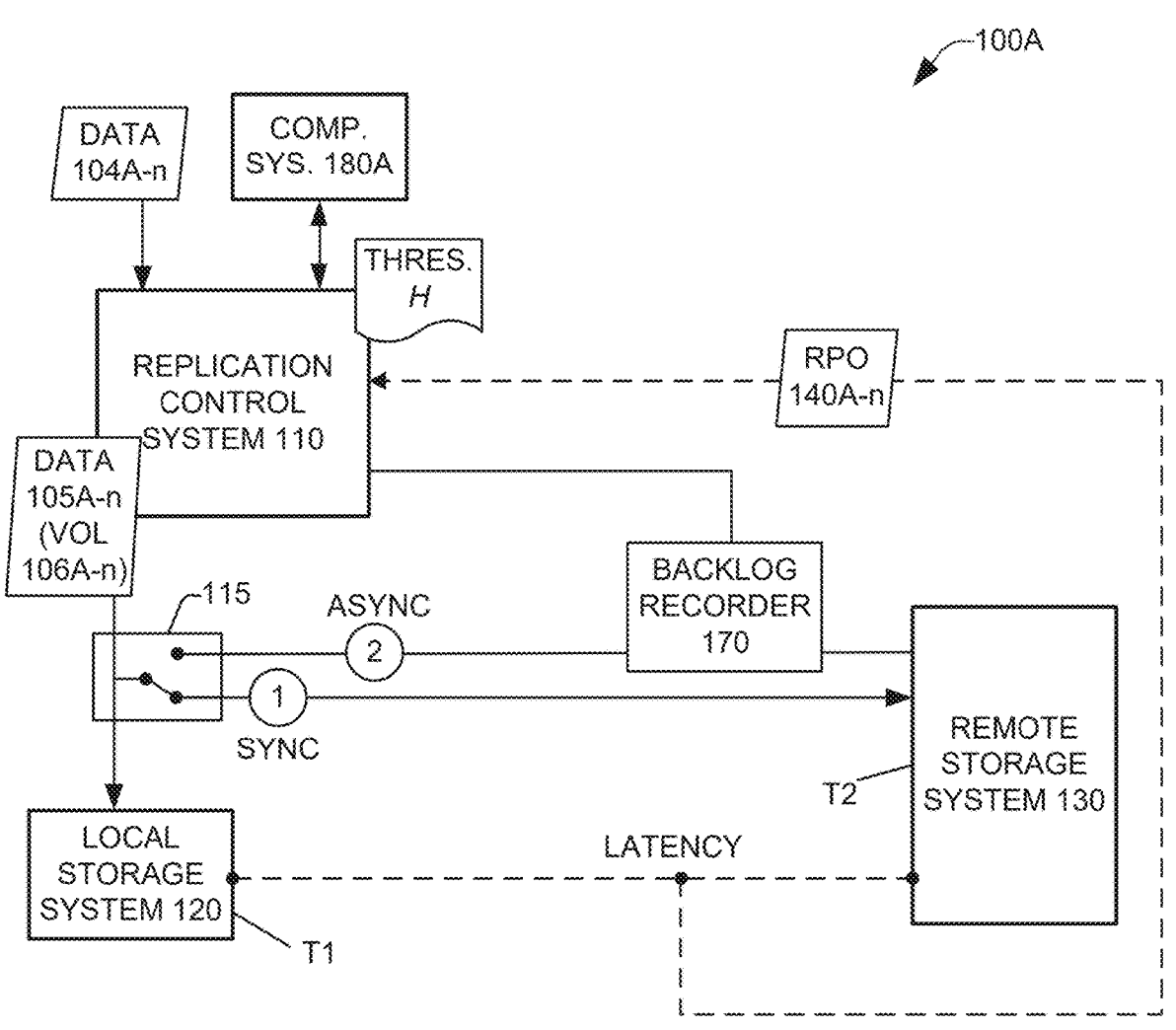
FIGS. 1A-1D present example schematics of a system configured to automatically adjust operation of a data replication system, in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

1. Overview

Data replication can involve writing/storing data/computer object(s) at two or more data storage locations/data repositories. In an aspect, a local storage system (LSS), a.k.a. a primary system, can be located local to a system initiating a write operation of a data object. A remote storage system (RSS), a.k.a. a replica system, can be located remote from where the write operation is being initiated. For example, LSS is onsite while RSS is a remote site.

Conventionally, an entity can choose how they want their data backed up based on one of two data replication processes.

a) a first replication process, sync replication involves writing to both the LSS and the RSS concurrently/ simultaneously. In a perfect scenario, the respective LSS and RSS, and the interconnecting network (e.g., a LAN) have to be sufficiently fast and with sufficient bandwidth such that writing to the RSS, and the potential delays/issues involved therewith, do not cause the RSS to add latency/slow down a corresponding write operation at the LSS. A subsequent write operation can only be performed after a write complete acknowledgement is generated for the prior write operation at both the LSS and the RSS.

b) a second replication process, async replication involves initially writing first data to the LSS and subsequently writing the data to the RSS. Writing of data to the LSS does not have to wait for the data to be written to the RSS. While the first data is being written to the RSS, second data can be being written to the LSS. Owing to the non-concurrent approach of first writing to the LSS and then to the RSS, issues such as bandwidth and write speeds are less stringent with async replication than with sync replication.

Conventionally, recovery point objective (RPO) and recovery time objective (RTO) parameters can be utilized to determine implementation of sync-mode operation or async-mode operation. RPO indicates an interval of time that can pass during a disruption until a defined amount/volume of data is lost. RTO is a period of time by which a data storage operation is to be back online after a disaster, e.g., where the period of time can be defined by a service level agreement (SLA) that is guaranteed to be met (e.g., by the data storage provider).

With sync replication, owing to the simultaneous data writes to by the LSS and RSS, in the event of writing at the RSS is slow (e.g., limited transmission bandwidth to the RSS), the corresponding write operation(s) at the LSS is also impacted. Hence, while sync replication is designed to offer an RPO of zero, 0-RPO, owing to device issues, network issues, etc., it can be difficult to guarantee a latency SLA of zero/no replication delay, particularly where the network or a storage system(s) become a single point of failure.

The serial nature of operation of the async process can render it difficult/complex to integrate an async operation in processes involving applications with strict RPO requirements. Particularly where lower bandwidth equipment is used for async operations compared with the high speed and high bandwidth network/high write speed equipment used in with sync operation.

Per the foregoing, while the conventional approach to data storage selection is sync or async operation, the various embodiments presented herein relate to systems, methods, operations, and the like, for an amalgamated system which can implement/function with both sync and async operations. As further described, self-adaptive replication systems and methods are presented, implemented based on a customer-defined SLA versus a currently achievable RPO at the data storage system, e.g., as determined from current operating conditions at the storage system. Mode of replication can be dynamically selected between sync and async based on the determined RPO. Hence, while conventional systems are binary in nature, the various embodiments presented herein enable selection of sync, async, or flexible sync/async combination. In an aspect, rather than a customer selecting sync replication or async replication, they can also be provided with the option of flexible replication.

Further, the self-adaptive system utilizes system resources more efficiently than a conventional system. For example, unlike an async-only replication system which always functions with an initial delay between writing to the local and remote devices, the various embodiments presented herein can also utilize sync replication when system resources are able to satisfy the demand of sync replication. When the data write load increases and the system resource or network bandwidth is insufficient to maintain the same replication throughput, replication can be automatically switched to async mode, and further return to sync mode when bandwidth, etc., become sufficient.

Furthermore, unlike async-only replication handling replication in an async flow, the various embodiments can provide an indication of replication backlog (e.g., buffer memory use) in a more direct manner. Such as, when replication mode is switched from sync to async, a response header can be immediately returned inside the response of write request, enabling treatment of a write replication backlog as a backpressure for use cases when sync replication is a hard requirement to achieve.

Further, the various embodiments presented herein overcome the site failure short comings of a conventional sync replication system. Data replication can be switched to async replication at a source site automatically in the event of the target site is down, wherein the source site and target site can be either of the local storage system or the remote storage system. Hence, failure of the local storage system or the remote storage system does not impact availability of other storage system.

2. Self-Adaptive Replication System

FIGS. 1A-1D present example schematics of a system 100 configured to automatically adjust operation of a data replication system, in accordance with one or more embodiments. The term n, as used herein is any positive integer.

Figure 1B:
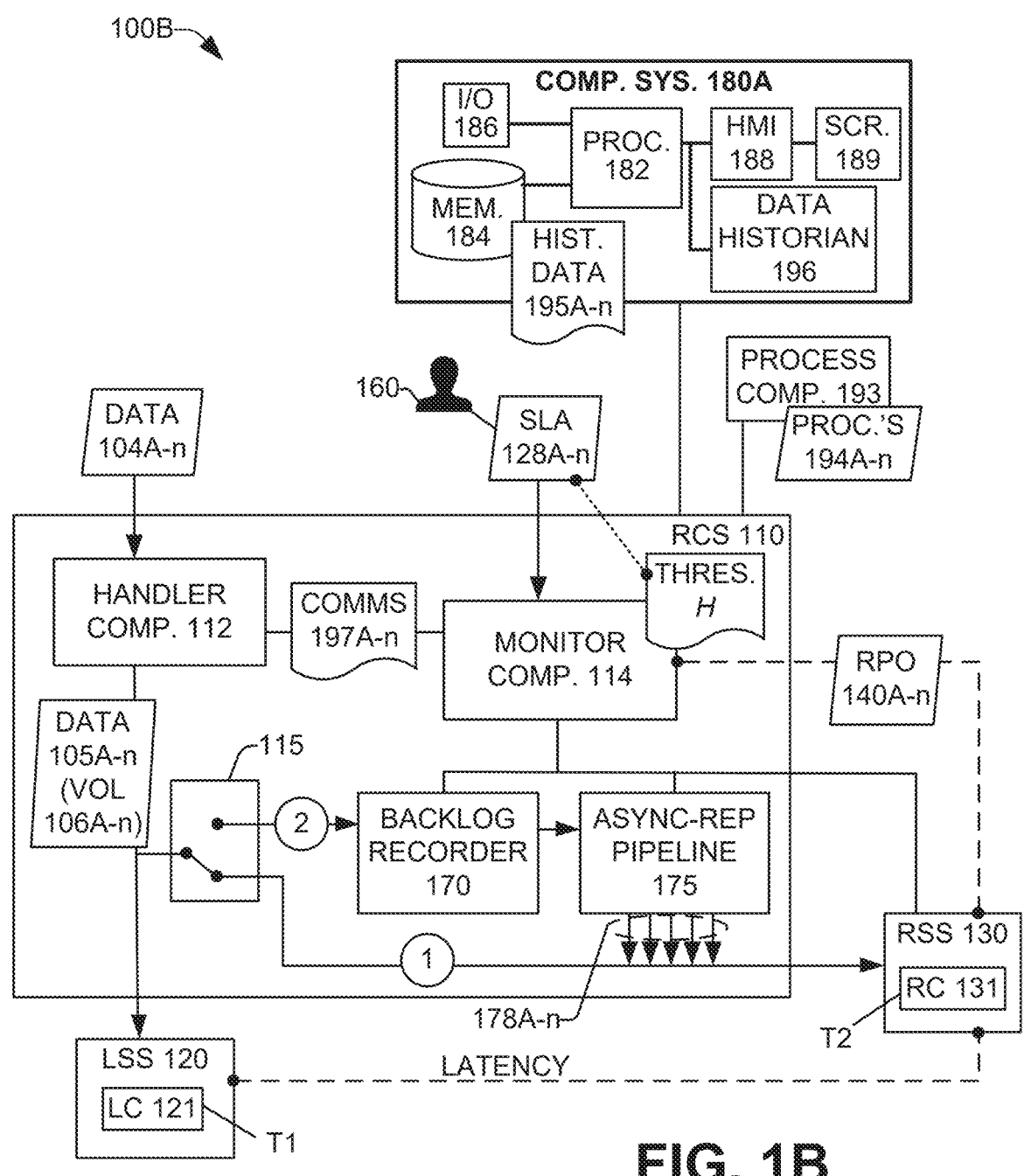
Figure 1C:
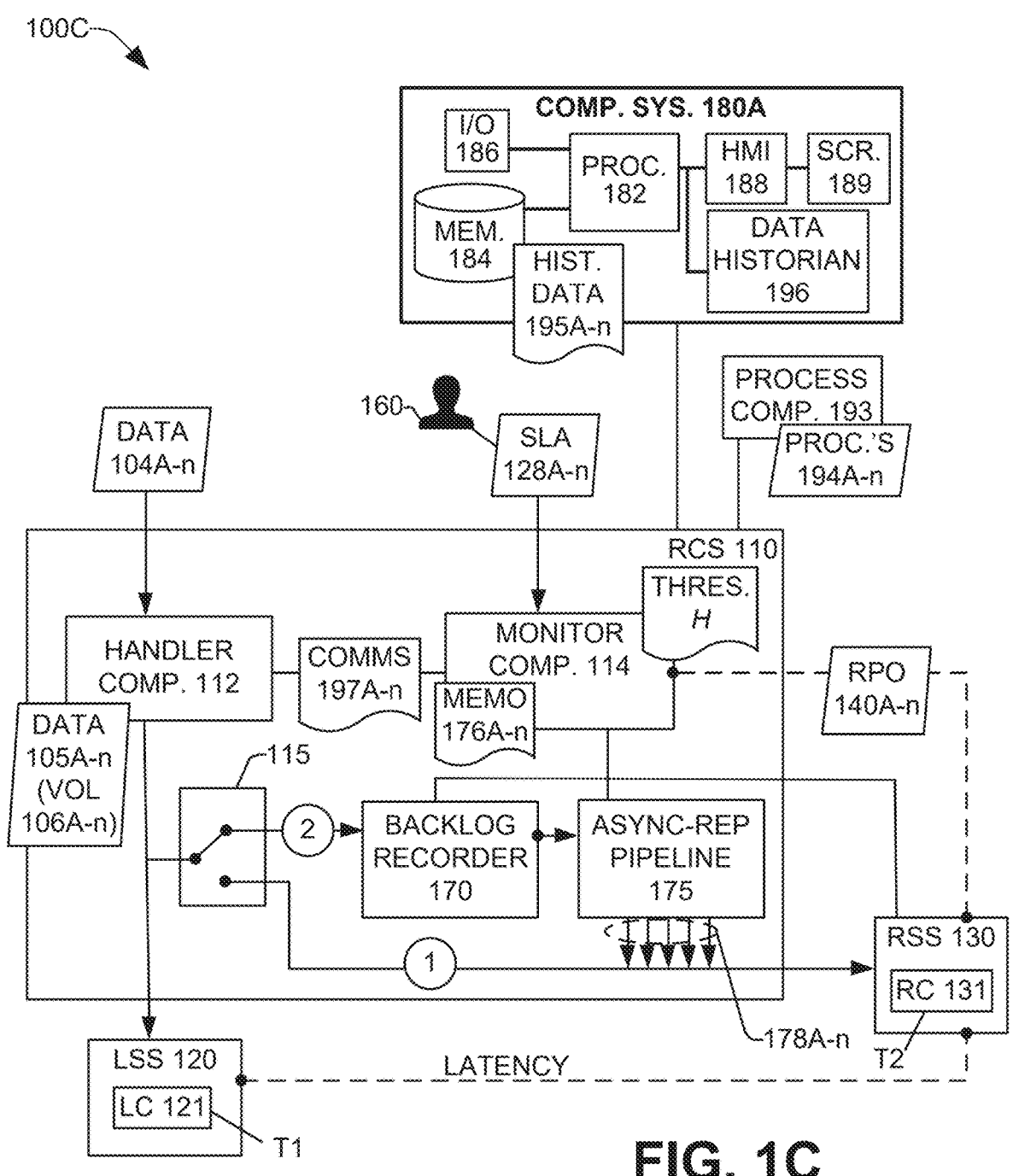
Figure 1D:

As further described, FIG. 1A provides a high-level overview of the various embodiments presented herein, FIG. 1B illustrates system 100 during a sync replication process (utilizing path 1), FIG. 1C illustrates system 100 during an async replication process (utilizing path 2), and FIG. 1D illustrates system 100 during a pass-through operation.

As shown, system 100 can include replication control system (RCS) 110, configured to control storage of data at a local storage system (LSS) 120 and a remote storage system (RSS) 130. System 100 can be configured to implement sync replication (e.g., on path 1) and async replication (e.g., on path 2). Data can be received in an initial form, data 104A-n, and formatted/processed at RCS 110, to form data 105A-n (e.g., packetized, and the like, with respective data packet volumes 106A-n), for injection to LSS 120 and RSS 130. Data can be received as data 104A-n, where data 104A-n can be in the form of streaming data received at the RCS 110, or in the form of packetized data, e.g., first data packet 104A, second data packet 104B, $n^{th}$ data packet 104n.

System latency, expressed as RPO 140A-n, represents write delay between a write operation for a first copy of first data 105A at LSS 120 (having a duration of T1) and a write operation for a second copy of data 105A at RSS 130 (having a duration of T2), e.g., RPO 140A=T2−T1, and compared with a threshold H. In the event of a determined RPO 140A is less than threshold H, sync replication can be utilized on path 1, e.g., a write operation(s) of data at RSS 130 is concurrent, or substantially concurrent, with a write operation(s) of data at LSS 120. In the event of a determined RPO 140A equals, or exceeds, threshold H, async replication can be utilized on path 2, e.g., a write operation(s) of data at RSS 130 can lag a write operation(s) of data at LSS 120. RPO 140A-n can be an RPO that is currently achievable RPO, a future RPO, a prior RPO, etc.

RCS 110 can be configured to control operation of switch 115, switching between sync-mode, path 1, and async-mode, path 2. As further shown, path 1 provides a direct link from the RCS 110 to RSS 130. Path 2 includes a backlog recorder component 170 configured to store/buffer any second data that has yet to be written to RSS 130 while first data is being written to RSS 130, wherein, in an example scenario, the first data and second data have been written to LSS 120. As further described, any components included in system 100 (e.g., RCS 110, and subcomponents, and such, can include/be communicatively coupled to a computer system 180, comprising at least one processor 182A-n and memory 184A-n.

Turning to FIGS. 1B and 1C, RCS 110 can include a handler component 112 configured to process/transform data 104A-n as data 105A-n as required to efficiently/effectively transmit and/or store data 105A-n at LSS 120 and RSS 130. Accordingly, handler component 112 can be configured to combine data packets 104A-n into data packets 105A-n, separate streaming data 104 into data packets 105A-n, etc.

Handler component 112 can be further configured to control operation of switch 115. During sync replication (FIG. 1B), switch 115 is in a first position, such that data 105A-n is directed to be stored at LSS 120 and at RSS 130 via a first network path, path 1 (a.k.a., first path). During async replication (FIG. 1C), switch 115 is in a second position, such that data 105A-n is directed to be stored at LSS 120 and at RSS 130 via a second network path, path 2 (a.k.a., second path).

Selection of path 1 or path 2 can be based on an RPO 140A-n relative to an SLA 128A-n, wherein SLA 128A-n can be received at a monitor component 114, e.g., from a customer 160. In an aspect, system 100 can be designed to meet the SLA 128A-n, for example, LSS 120 and RSS 130 can be selected to have sufficient write speeds to meet an SLA 128A, whereby, components in paths 1 and 2 (as further described) have minimal data transmission latency, and the like. However, rather than system 100 having to be designed to comprise of equipment (and associated cost/complexity) to meet the SLA 128A with sync-mode replication, a less-operationally optimal system can be utilized based on implementing async-mode replication and potentially taking advantage of, for example, periods of no-data writes operations at LSS 120, moments during which buffered data from the async-mode operation can be stored in RSS 130 while LSS 120 is temporarily idle.

SLA 128A-n acts as a measure/foundation of RPO 140A-n. For example, an SLA of 0-2 minutes can be utilized for critical data, e.g., data that cannot be lost, such as banking transactions. Hence, for a customer 160 concerned with back up of critical data, ideally customer 160 would prefer their information to be stored at LSS 120 and RSS 130 concurrently, with an RPO=0. However, per the SLA 128A-n, customer 160 can accept a lag having a lower bound, $T_L$ of 0 seconds and an upper bound, $T_U$ of 2 minutes.

RPO 140A-n can change in accordance with current operational condition(s) at system 100. A monitor component 114 can be configured to monitor operation of system 100, and further generate the RPO 140A-n in accordance with the current operating conditions of storage of data 105A-n at LSS 120 and RSS 130. Monitor component 114 can be communicatively coupled to a LSS control component (LC 121) configured to control, report operational condition, duration T1, etc., of LSS 120. Monitor component 114 can be further communicatively coupled to an RSS control component (RC 131) configured to control, report operational condition, duration T2, etc., of RSS 130. In an example scenario of application, in response to a determination by monitor component 114 that both LSS 120 and RSS 130 are able to store data 105A-n as it is received at LSS 120 and RSS 130, e.g., T1≈T2, monitor component 114 can generate an RPO 140A, where RPO 140A=0, or substantially 0. However, owing to system lag on path 1, writing of a first data packet 105A to RSS 130 can be delayed, e.g., slightly delayed, from the writing of first data packet 105A to LSS 120, e.g., T2>T1. Accordingly, monitor component 114 determines/generates, in view of the delay, that system 100 now has an RPO 140B of 5 seconds (e.g., T2–T1=5 seconds). In response to a determination that system lag between writing an $n^{th}$ data packet 105n to LSS 120 and RSS 130 is increasing, monitor component 114 determines RPO 140C is now 13 seconds (e.g., T2–T1=13 seconds).

Threshold H can be defined as a function of the time period defined in the SLA 128A-n, where H can function as a switchover point between sync and async operation. For example, with SLA 128A=2 minutes, with a preference that data replication has an RPO=0, or substantially 0, threshold H can be set to 10 seconds. Hence, where RPO 140A is determined to meet H<10 seconds, data 105A-n can be written to LSS 120 and RSS 130 using sync replication, e.g., via path 1. However, for a determined RPO of between 10 seconds and 2 minutes, data 105A-n can be written to LSS 120 and RSS 130 using async replication, e.g., via path 2. With $T_U$ set to 2 minutes, in the event of the upper bound being approached/met/triggered, monitor component 114 can be configured to generate and transmit a notification (e.g., in communication 197N, as further described) to a network administrator (not shown) indicating system 100 is experiencing an unacceptable level of write delay, requiring further investigation.

As mentioned, monitor component 114 can be configured to instruct handler component 112 to control operation of the switch 115 based on the relationship between RPO 140A-n and threshold H. With an RPO 140A below the threshold H, monitor component 114 can instruct (e.g., in an instruction 197A, as further described) handler component 112 to position switch 115 in the first position, such that data 105A-n is transmitted to LSS 120 and further to RSS 130 via the first path. With an RPO 140A at or above threshold H, monitor component 114 can instruct (e.g., in a communication 197B) handler component 112 to position switch 115 in the second position, such that data 105A-n is transmitted to LSS 120 and further to RSS 130 via the second path.

In an embodiment, switching from a sync-mode operation to an async-mode operation can occur during mid-storage of data to LSS 120 and RSS 130, such that in the event of monitor component 114 determines that the latency of storing data to RSS 130 exceeds the threshold H, monitor component 114 can be configured to instruct handler component 112 to operate switch 115 to path 2 during the write operation such that partially written data can be sent to a backlog recorder component 170 to free up subsequent data storage at LSS 120.

Path 1 and path 2 can include any components required for data replication at two or more locations, e.g., at one or more local storage systems (e.g., LSS 120A-n) located at one or more sites local to RCS 110, and one or more remote storage systems (e.g., RSS 130A-n) located at one or more sites remote to RCS 110. Components included in paths 1 and 2 can be a storage area network, a local area network (LAN), local wide area network, as well as cloud-based computing systems (e.g., RSS 130A is a cloud-based storage system). In an aspect, path 1 can comprise of high bandwidth/low latency components, while path 2 can comprise equipment having less available bandwidth than path 1. LSS 120 and RSS 130 can be a data server(s), storage arrays, on- or off-premises, combination (hybrid) of physical locations and cloud-based services, and the like.

Regarding components in the second path between switch 115 and RSS 130, the second path can comprise of components that can potentially function with lower bandwidth/higher latency than the components included in the first path. Further, to accommodate the latency of an RPO at or above threshold $T_H$, a backlog recorder component 170 and an async replication pipeline 175 can be utilized. The async replication pipeline 175 can further include a set of channels/threads 178A-n, whereby monitor component 114 can instruct (e.g., in a communication 197I) the replication pipeline 175 to implement as many threads 178A-n as required to empty the backlog recorder component 170 to achieve a threshold H.

In an embodiment, the backlog recorder component 170 can be considered to be a memory buffer device. For example, in a write sequence comprising a first data packet 105A and a second data packet 105B, LSS 120 has sufficient speed/capacity to immediately store data packet 105A and subsequently data packet 105B. However, latency on path 1/RSS 130 causes a delay in writing data packet 105A to RSS 130, and a further delay in writing data packet 105B to RSS 130. Hence, while a data packet 105B is being written to LSS 120, the data packet 105B can be temporarily stored at the backlog recorder component 170, while the previously received data packet 105A is being written to RSS 130. In the event of a write issue/latency at RSS 130 is resolved, backlog recorder component 170 can instruct the async-replication pipeline 175 to implement as many threads 178A-n as possible to enable consumption of data 105A-n/ emptying of the backlog recorder component 170 as expeditiously as possible. A situation can arise, where no data 105A-n is currently being received at RCS 110, such that LSS 120 is not performing any write operations, and during the time of inactivity of LSS 120, data packets 105A-n in the backlog recorder component 170 can be transferred to RSS 130 as quickly as the available threads 178A-n can convey the data packets 105A-n to RSS 130. During such a time period, the value of the RPO 140A-n between RSS 130 and LSS 120 can be determined by the monitor component 114, such that the value of the RPO 140A-n drops below threshold H. With the RPO now having a value below the value of threshold H, the monitor component 114 can instruct the handler component 112 to change switch 115 to the first position, path 1.

In an aspect, latency can affect sync operation as a second data packet 105B cannot be written to both LSS 120 and RSS 130 until a write acknowledgement has been received from both LSS 120 (e.g., in communication 197A generated by LC 121) and RSS 130 (e.g., in communication 197B generated by RC 131) that a first data packet 105A, to be stored prior to the second data packet 105B, has been written to both LSS 120 and RSS 130. Hence, if writing to RSS 130 is slowed (e.g., limitation of write speed at RSS 130, bandwidth/data transmission issues between RCS 110 and LSS 120/RSS 130), latency is introduced. If the latency becomes significant, then sync operation may not be available as the latency introduces further delay/domino-effect in writing data to RSS 130, and async replication can be temporarily implemented to buffer data transmission to RSS 130, with write operations at RSS 130 catching up during no-write periods at LSS 120, for example.

While sync operation requires write acknowledgements (acknowledgements 197K and 197L from LC 121 and RC 131 to monitor component 114) from LSS 120 and RSS 130, with async replication, data 105A-n can be buffered at the backlog recorder component 170, writes to RSS 130 when RSS 130 is able to receive the data, with RSS 130 and LSS 120 being able to operate in isolation with regard to write operations, with the RPO 140A-n being a measure of the write delay between LSS 120 and RSS 130. Hence, in an aspect, the volume/amount of data buffered at the backlog recorder component 170 is the controlling parameter of switching between async replication and sync replication. An async write process can be considered to be complete upon receipt, at monitor component 114, of an acknowledgment 197C generated by LC 121 indicating completion of a write process at LSS 120.

In another embodiment, per FIG. 1D, the backlog recorder 170 can be configured to utilize a memo/list 176A-n detailing data (e.g., data 105P) that has been written to LSS 120, but the data is still to be transmitted to RSS 130. Accordingly, as a write operation at RSS 130 is completed, list 176A-n can be reviewed by backlog recorder 170 and the next data to be written, as listed in list 176A-n, can be written to RSS 130. In a non-limiting sequence of events:

(a) data 105P is written to LSS 120, wherein data 105P has an identifier 177A-n, e.g., identifier 177P;

(b) monitor component 114 monitors latency between LSS 120 and RSS 130, wherein, in the event of no latency is occurring between RSS 130 and LSS 120, backlog recorder 170 can be configured to function as a pass through component, and data 105P is written to both LSS 120 and RSS 130 in a manner comparable to the Sync operation.

(c) alternatively, in response to a determination by the monitor component 114 that latency is occurring between LSS 120 and RSS 130, the monitor component 114 can be configured to instruct backlog recorder 170 to obtain the identifier 177P of the data 105P that is unable to be written to RSS 130 and add the identifier 177P to the list 176A-n.

(d) the backlog recorder 170 and/or monitor component 114 can be configured to monitor write operations being performed at RSS 130, and in response to determining no write operations are being performed at RSS 130 (e.g., a write operation can be performed at RSS 130), the backlog recorder 170 can review list 176A-n, identify data 105P listed in list 176A-n by the data identifier 177P, and initiate writing of the data 105P to RSS 130. During the write process, backlog recorder 170 can be configured to retrieve the respective data 105P from LSS 120 and write the data 105P to RSS 130.

(e) in response to a subsequent determination by monitor component 114 that the latency is acceptable for sync-replication, monitor component 114 can be configured to instruct the backlog recorder 170 to return to pass-through operation, with subsequent received data 105A-n being stored at LSS 120 and RSS 130 as previously described.

Artificial intelligence (AI) and machine learning (ML) technologies and techniques (e.g., in processes 194A-n, as further described) can be used. In an example, a prediction of the future operation of system 100 can be utilized. For example, based on respective write speeds at LSS 120 and RSS 130, the difference may be 500 megabytes per second. Current and future volumes 106A-n of data 104A-n/105A-n to be stored at system 100 can be identified, and in view of the latency, a determination/prediction can be made regarding whether the SLA 128A-n can be met, and further, whether the threshold H is to be shifted. In a further embodiment, rather than simply comparing a prior data write (having a volume 106X) and a known volume (having a volume 106Y) of data to be written, it is possible to review a customer's usage pattern, e.g., last week, last month, etc., to determine a threshold H. In an aspect, implementation of the H/switch point, this can be changed to reduce the impact of RSS 130 slowing down LSS 120. For example, while a customer 160 prefers a threshold H to be close to RPO=0, and is operating with H=10 seconds, it might be possible to operate with H=30 seconds, thereby enabling the latency between LSS 120 and RSS 130 to be at an acceptable amount.

Hence, H can be placed to enable aggressive injection/ storage of data 105A-n, or H can be placed to be more conservative. Over a period of time, e.g., weeks, months, years, a pattern of storing of data 105A-n can be determined, such that, for example, between 6-7 PM daily, customer 160 performs data replication of a significant amount of data, e.g., 50 times a normal hourly amount. Accordingly, at 5.55 PM on each day, system 100 can be placed in async mode by monitor component 114 in preparation for the anticipated replication of data 105A-n between 6-7 PM. At 7.05 PM, monitor component 114 can return system 100 to sync data replication.

Various communications 197A-n can be utilized across system 100/RCS 110, between monitor component 114, handler component 112, backlog recorder component 170, async replication pipeline 175, LC 121, LSS 120, RC 131, RSS 130, computer system 180, process component 193, etc. Communications 197A-n can include notifications, instructions, status updates, selections, data, information (e.g., data 104A-n, data 105A-n, RPOs 140A-n, threshold H, SLA 128A-n, and such), and the like.

As shown in FIG. 1B, any of the components (e.g., RCS 110, handler component 112, monitor component 114, backlog recorder component 170, async replication pipeline 175, LSS 120, LC 121, RSS 130, RC 131, and the like), and process component 193 (as further described below), etc., can be communicatively coupled to a computer system 180. Computer system 180 can include a processor 182 and a memory 184, wherein the processor 182 can execute the various computer-executable components, functions, operations, etc., presented herein, e.g., any of components in system 100/RCS 110, monitor component 114, handler component 112, backlog recorder component 170, async replication pipeline 175, LSS 120, LC 121, RSS 130, RC 131, computer system 180, process component 193, and such. The memory 184 can be utilized to store the various computer-executable components, functions, code, etc., as well as information regarding any of data 104A-n, data 105A-n, RPO 140A-n, threshold H, SLA 128A-n, communications 197A-n, vectors $V_{1-n}$, similarity indexes $S_{1-n}$, processes 194A-n (as further described below), historical data 195A-n, and suchlike.

As further shown, computer system 180A-n can include an input/output (I/O) component 186, wherein the I/O component 186 can be a transceiver configured to enable transmission/receipt of information and data between any of the components included in system 100. In an embodiment, I/O component 186 can be configured to transmit various communications 197A-n regarding data 104A-n/105A-n, SLA 128A-n, RPO 140A-n, threshold H, e.g., LC 121 and RC 131 regarding operation of LSS 120 and RSS 130, as required, to enable efficient and timely storage of data 105A-n at LSS 120 and RSS 130.

In an embodiment, the computer system 180 can further include a human-machine interface (HMI) 188 (e.g., a display, a graphical-user interface (GUI)) which can be configured to present various information including any of data 104A-n/105A-n, SLA 128A-n, RPO 140A-n, threshold H, e.g., sync or async operation of LSS 120 and RSS 130, etc., per the various embodiments presented herein. The HMI 188 can include an interactive display 189 to present the various information via various screens presented thereon, and further configured to facilitate input of SLA 128A-n, manual adjustment of thresholds H, etc.

System 100 can further include a data historian 196 configured to compile historical data 195A-n (e.g., prior and/or current data/information/knowledge) regarding sync or async operation of LSS 120 and RSS 130, prior implemented SLA 128A-n and threshold H, determined RPO 140A-n, etc., with regard to enable efficient and timely storage of data 105A-n at LSS 120 and RSS 130.

System 100 can further include a process component 193 and processes 194A-n. In an embodiment, processes 194A-n can include AI and ML processes which can be utilized review data 104A-n/105A-n, data volume 106A-n, RPOs 140A-n, SLAs 128A-n, thresholds H, respective operation of switch 115 and paths 1 and 2, etc., to, for example, determine/recommend a future operation of switch 115.

It is to be appreciated that while process component 193 and processes 194A-n, data historian 196 and historical data 195A-n are depicted as being included/coupled to computer system 180, process component 193 and processes 194A-n, data historian 196 and historical data 195A-n and be located and implemented at any suitable location/activity/process undertaken across system 100.

3. Methods for Self-Adaptive Data Replication

Figure 2:
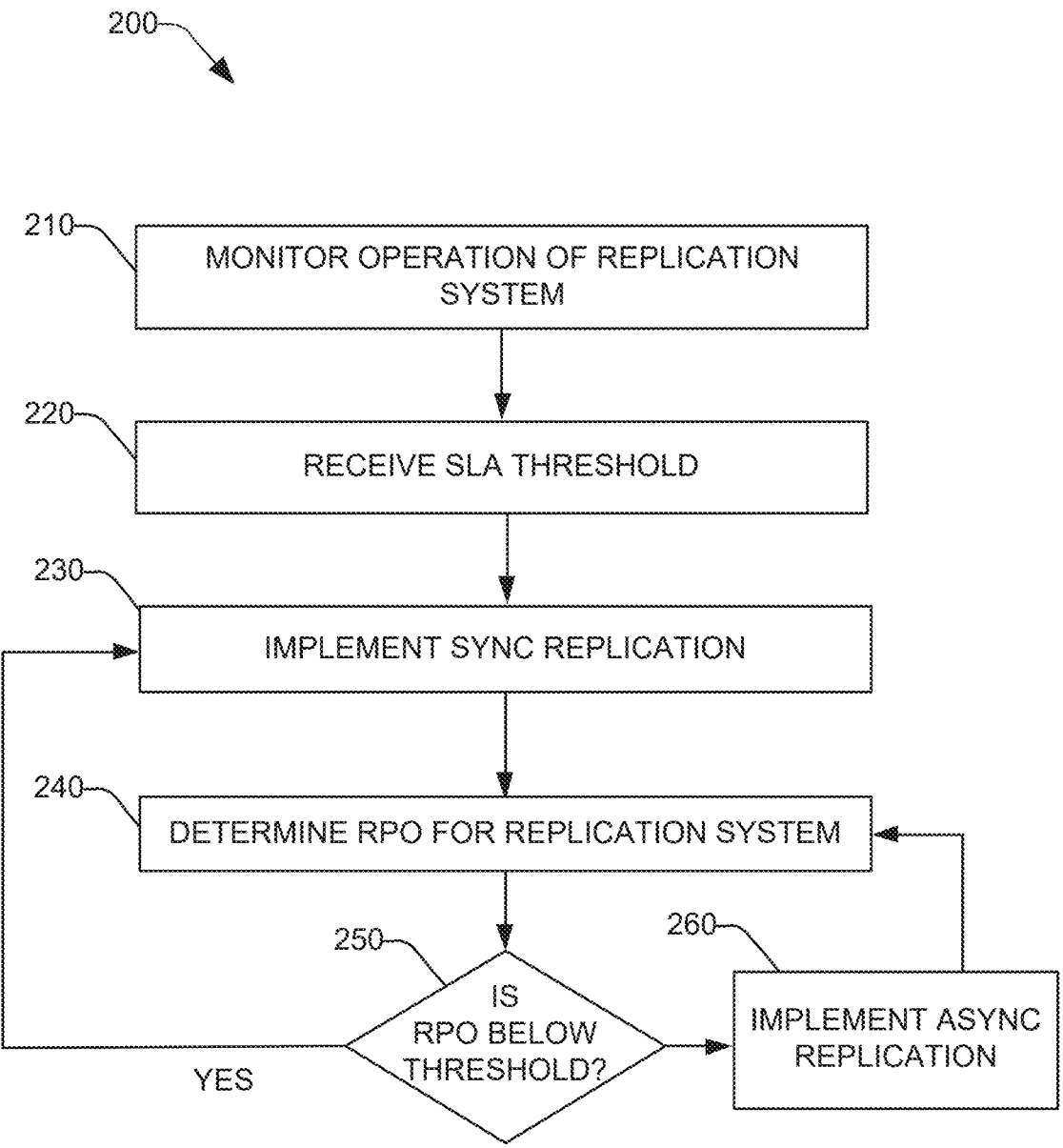
FIG. 2 presents an example computer-implemented method for self-adaptive replication of a data storage system, in accordance with one or more embodiments.

FIG. 2, via flowchart 200, presents an example computer-implemented method for self-adaptive replication of a data storage system, in accordance with one or more embodiments.

At 210, monitoring (e.g., by monitor component 114) of a data replication system (e.g., system 100) can be initiated, wherein the system can be configured to implement sync replication and async replication as a function of latency of storing data (e.g., data 104A-n/105A-n) at a local storage system (e.g., LSS 120) and a remote storage system (RSS 130). As previously mentioned, write latency can occur as a function of a delay in writing a first data (e.g., data 105A) to the local data storage and the remote data storage.

At 220, an SLA threshold (e.g., threshold H) can be received, wherein the threshold can be a portion/percentage of an SLA (e.g., SLA 128A-n). In an embodiment, the SLA can be used as a measure of the maximum latency a customer (e.g., customer 160) can accept.

At 230, operation of the replication system can be initially implemented with a sync replication process.

At 240, a current RPO (e.g., RPO 140A) can be determined (e.g., monitor component 114 determines $T2-T1=RPO$ 140A).

At 250, in response (e.g., by monitor component 114) to a determination that RPO is less than the threshold, method 200 can return to step 230 for further implementation of the sync replication process.

At 250, in response (e.g., by monitor component 114) to a determination that RPO is equal or greater than the threshold, method 200 can advance to step 260 for implementation of the async replication process. With the async replication process implemented, method 200 can return to step 240, for further determination of a subsequent RPO and comparison with a threshold.

FIG. 3, via flowchart 300, presents an example computer-implemented method for self-adaptive replication of a data storage system, in accordance with one or more embodiments.

At 310, sync replication can be implemented at a replication system (e.g., system 100), wherein a monitor component (e.g., monitor component 114) can control a handler component/switch (e.g., handler component 112 and switch 115) to be in a first position, with data (e.g., data 105A-n) being transmitted on a first data path (e.g., path 1);

At 320, a first write acknowledgement (e.g., in communication 197A) can be generated (e.g., by monitor component 114, LC 121), wherein the first write acknowledgement is a first time, T1, at which a first data (e.g., first copy of data 105A) is written to a first storage device (e.g., LSS 120);

At 330, a second write acknowledgement (e.g., in communication 197B) can be generated (e.g., by monitor component 114, RC 131), wherein the second write acknowledgement is a second time, T2, at which the first data (e.g., second copy of data 105A) is written to a second storage device (e.g., RSS 130);

At 340, a current RPO (e.g., RPO 140A) can be determined (e.g., by monitor component 114), wherein the RPO=T2–T1;

At 350, the RPO (e.g., RPO 140A) can be compared (e.g., by monitor component 114) with a threshold H; where threshold H can be manually set (e.g., by customer 160, or a system engineer of system 100), or automatically determined (e.g., by monitor component 114) based, for example, on a percentage of an SLA (e.g., threshold H is 10% of the time in SLA 128A), At 355, in the event of a determination (e.g., by monitor component 114) that YES, the RPO less than threshold H, sync replication can be maintained (e.g., by the monitor component 114), whereby method 300 can return to step 310, for the next data storage process by sync replication;

At 355, in the event of a determination (e.g., by monitor component 114) that NO, the determined RPO equals or exceeds threshold H, method 300 can advance to step 360 where async replication can be implemented (e.g., by monitor component 114). At 360, during async replication, async replication can comprise, storing data (e.g., second copy of data 105B) at a backlog recorder (e.g., backlog recorder component 170) while a first copy of the data (e.g., first copy of data 105B) is being written to the second storage device (e.g., at RSS 130);

At 370, memory usage of the backlog recorder can be monitored (e.g., by monitor component 114) to determine (e.g., by the monitor component 114) a volume (e.g., volume 106B of the second copy of data 105B) stored in the backlog recorder.

At 375, a determination (e.g., by the monitor component 114) can be performed to determine whether the backlog recorder is empty, e.g., has volume of data (e.g., volume 106B of the second copy of data 105B) stored in the backlog recorder reduced to zero? In response to a determination that while a third data (e.g., data 105C) is to be stored, that NO, the backlog recorder is not empty, method 300 can return to act 360, where async replication can be maintained.

At 375, in response to determining (e.g., by the monitor component 114) that YES, the backlog recorder is empty, e.g., volume of data (e.g., volume 106B of the second copy of data 105B) stored in the backlog recorder has reduced to zero, method 300 can advance to step 380.

At 380, a third acknowledgement (e.g., third acknowledgement 197C) can be generated (e.g., at RC 131) that the backlog recorder is empty, with the third acknowledgement transmitted to the RCS (e.g., to the monitor component 114); and At 390, in response to receiving the third acknowledgement, the monitor component can be configured to re-implement sync replication, with the handler component/switch adjusting the replication process to the first position/path 1, returning to step 310.

In an aspect, steps 370-390 can be performed in a predictive manner, such that with knowledge of the write speed between the backlog recorder component 170 and the RSS 130 and knowing the amount of data 105 to be written to the backlog recorder component 170, the monitor component 114 can be configured to determine a time at which the async replication process can switch back to the sync replication process, and in the event of no new write data 105A-n is received in the interim, the monitor component 114 can prepare handler component 112 to operate switch 115 to return to the first position and path 1 of sync replication.

FIG. 4, via flowchart 400, presents an example computer-implemented method for automatic self-adaptive replication of data via a combination of sync-mode and async-mode replication, in accordance with one or more embodiments. At 410, the process 400 can comprise a data replication system, comprising at least one processor (e.g., processor 182), and at least one memory (e.g., memory 184) coupled to the at least one processor and having instructions stored thereon, wherein, in response to the at least one processor executing the instructions, the instructions facilitate performance of operations, comprising: monitoring (e.g., by monitor component 114) a data replication operation regarding storage of data (e.g., data 104A-n/105A-n) at a first storage device (e.g., LSS 120) and at a second storage device (e.g., RSS 130). At 420, process 400 can further comprise determining a recovery point objective (e.g., RPO 140A-n) for the data replication at the first storage device and the second storage device. At 430, process 400 can further comprise comparing the RPO with a threshold (e.g., threshold H). At 440, process 400 can further comprise, in response to determining that the RPO is less than the threshold, storing the data using synchronous (sync) replication.

FIG. 5, via flowchart 500, presents an example computer-implemented method for automatic self-adaptive replication of data via a combination of sync-mode and async-mode replication, in accordance with one or more embodiments. At 510, process 500 can comprise comparing, by a device (e.g., RCS 110) comprising at least one processer (e.g., processor 182), a recovery point objective (e.g., RPO 140A-n) value of a data replication system (e.g., system 100) with a threshold value (e.g., threshold H), wherein the data replication system is initially operating in a synchronous (sync)-replication mode, and wherein first data (e.g., data 105A) is being written concurrently to a first data storage system (e.g., LSS 120) and a second data storage system (e.g., RSS 1300. At 520, process 500 can further comprise, in response to determining (e.g., by monitor component 114) that the RPO value equals or exceeds the threshold value, implementing, by the device, asynchronous (async)-mode replication to store second data (e.g., data 105B) to the first data storage system and the second data storage system.

FIG. 6, via flowchart 600, presents an example computer-implemented method for automatic self-adaptive replication of data via a combination of sync-mode and async-mode replication, in accordance with one or more embodiments. At 610, the process 600 can be performed by a computer program product stored on a non-transitory computer-readable medium (e.g., memory 184) and comprising machine-executable instructions, wherein, in response to being executed, the machine-executable instructions cause a system (e.g., processor 182, RCS 110) to perform operations, comprising initiating operation of a data replication system (e.g., system 100) with synchronous (sync)-mode replication. At 620, the instructions can further comprise determining a current recovery point objective (e.g., RPO 140A-n) based on a first duration (e.g., T1) applicable to writing a first copy of first data (e.g., first copy of data 105A) to a first storage device (e.g., LSS 120) and a second duration (e.g., T2) applicable to writing a second copy of the first data (e.g., second copy of data 105A) to a second storage device (e.g., RSS 130). At 630, the instructions can further comprise comparing the current RPO with a defined threshold (e.g., threshold H). At 640, the instructions can further comprise, in response to determining that the current RPO is less than the defined threshold, maintaining sync-mode operation to write a first copy of second data (e.g., first copy of data 105B) to the first storage device and to write a second copy of the second data (e.g., second copy of data 105B) to the second storage device.

4. Application/Implementation of AI & ML

As mentioned, the various embodiments presented herein can utilize various AI/ML model/technology/technique/architecture (e.g., process component 193 implementing processes 194A-n). AI/ML technologies and techniques can be configured to determine information, make inferences, predictions, etc., regarding threshold value H, current operation of system 100 as expressed by RPO 140A-n, when to switch between sync and async operation, and such.

Processes 194A-n can include AI, ML, and reasoning techniques/technologies that employ probabilistic and/or statistical-based analysis to prognose or infer an action that an entity desires to be automatically performed for carrying out various aspects thereof, e.g., automatically identifying conditions to switch between sync and async operation, and suchlike, which can be facilitated via an automatic classifier system and process. A classifier can be a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis to prognose or infer an action that a user desires to be automatically performed.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (as further described below). For example, SVM's are configured via a learning or training phase within a classifier constructor and feature selection module, e.g., included in process component 193. Thus, the classifier(s) can be used to automatically learn and perform a number of functions, including but not limited to, determining according to predetermined criteria, e.g., monitoring current operation of replication at LSS 120 and RSS 130, and determining whether a sync-mode replication can be maintained or async-mode replication should be implemented to meet a SLA, and vice-versa, and suchlike.

In an example embodiment, processes 194A-n can be trained/fine-tuned with previously obtained/generated data (e.g., in historical data 195A-n, previously implemented SLAs 128A-n, thresholds H, data 104A-n/105A-n, RPOs 140A-n, and such). Fine-tuning of a process 194A-n can comprise application, to processes 194A-n, of previously implemented SLAs 128A-n, thresholds H, data 104A-n/105A-n, RPOs 140A-n, and suchlike. Processes 194A-n can be correspondingly adjusted by the ability of the processes 194A-n (process component 193, and any associated component across system 100 utilizing processes 194A-n) to successfully/or unsuccessfully determine a threshold H, based on any of historical data 195A-n, that can be implemented for a current or future determined RPO 140A-n. For example, weightings in the process 194A-n are adjusted by application of the ability to accurately determine a previously defined threshold H that is suitable for application with sync/async operation, per a current or future RPO 140A-n. During training, prior decisions, prior observations, determinations, etc., can be applied to the processes 194A-n, enabling the processes 194A-n to be trained regarding correctly identifying a threshold H to implement with a current/future RPO 140A-n. Accordingly, when new information is provided (e.g., a new threshold H, RPO 140A-n, SLA 128A-n, and suchlike), processes 194A-n can be retrained accordingly.

It is to be appreciated that the various processes 194A-n and operations presented herein are simply examples of respective AI and ML operations and techniques, and any suitable technology can be utilized in accordance with the various embodiments presented herein. In an example embodiment, process component 193/processes 194A-n can be applied to previously identified/implemented thresholds H and SLAs 128A-n, in historical data 195A-n, and such, in conjunction with a newly determined RPO 140A-n. Wherein, process component 193/processes 194A-n can include a vector component to apply any suitable vectoring technology, such as, in a non-limiting list, bag of words (BOW) text vectors, Euclidean distance, cosine similarity, vector representation via term frequency-inverse document frequency (tf-idf) capturing term/token frequency (e.g., common terms across prior/current/future knowledge), neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, regular pattern expression matching, and suchlike. Language models, LSTMs, BARTs, etc., can be formed with a neural network that is highly complex, for example, comprising billions of weighted parameters.

Accordingly, in an embodiment, implementation of system 100 and included/associated components, with processes 194A-n, enables natural language processing (NLP) (e.g., utilizing vectors) to identify a previously implemented operation to write data 105A-n to LSS 120 and RSS 130, apply the previously implemented operation to a current or future operation to write data 105A-n to LSS 120 and RSS

130, and further make a recommendation on whether to implement sync-mode replication or async-mode replication.

5. Example Environments of Use

Figure 7:
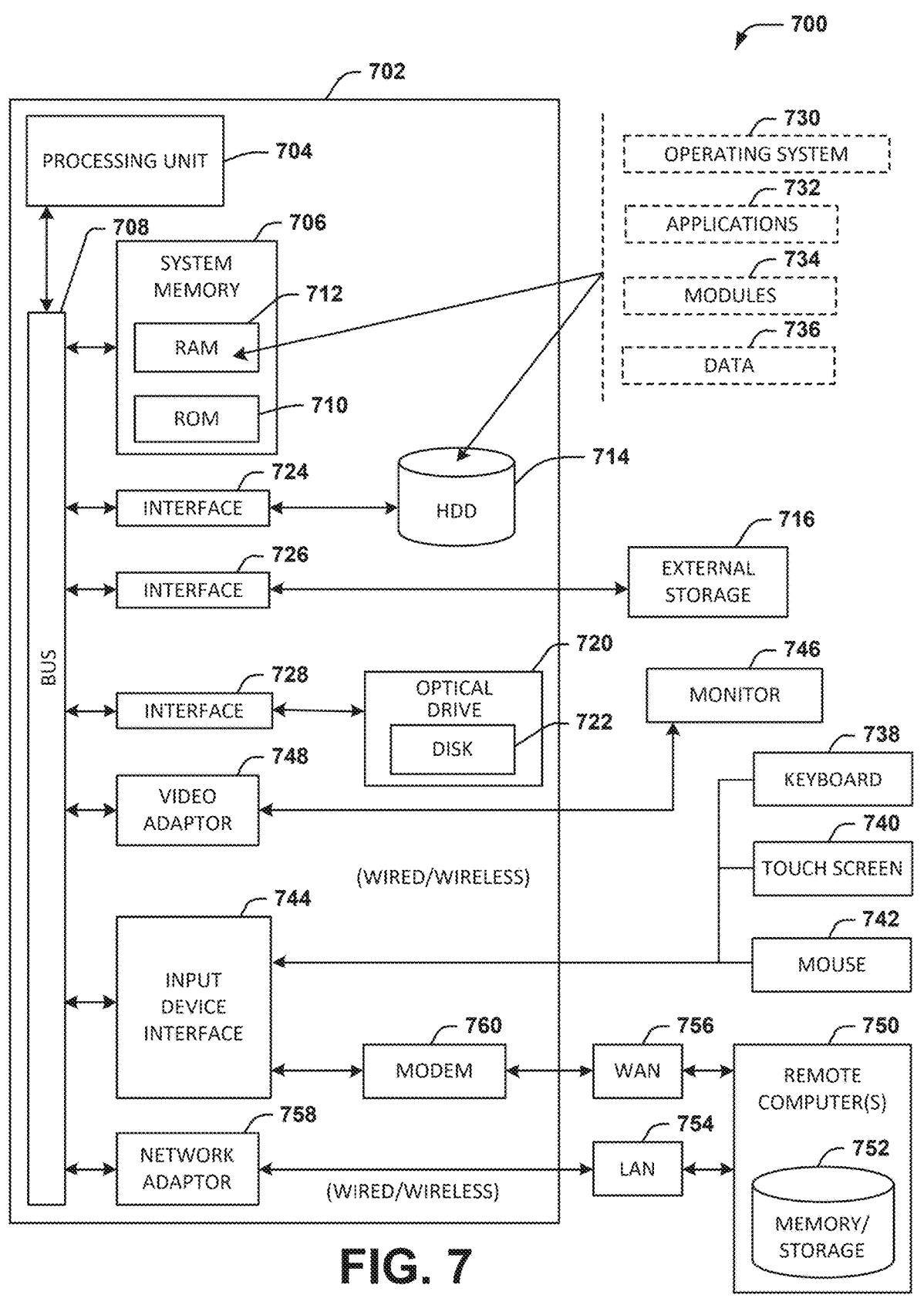
FIG. 7 presents an example environment for implementing various embodiments presented herein.
Figure 8:
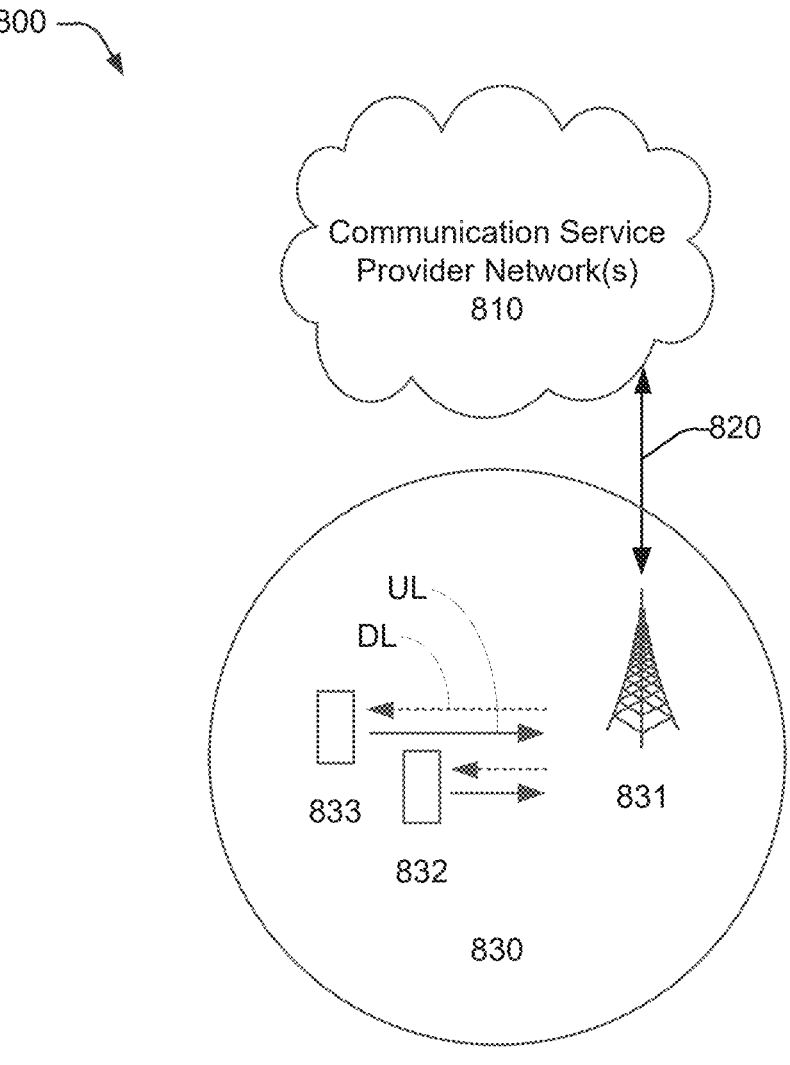
FIG. 8 illustrates an example wireless communication system, in accordance with one or more embodiments described herein.

Turning next to FIGS. 7 and 8, a detailed description is provided of additional context for the one or more embodiments described herein with FIGS. M-n.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 750 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 750 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are examples and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 8 illustrates an example wireless communication system 800, in accordance with one or more embodiments described herein. The example wireless communication system 800 comprises communication service provider network(s) 810, a network node 831, and user equipment (UEs) 832, 833. A backhaul link 820 connects the communication service provider network(s) 810 and the network node 831. The network node 831 can communicate with UEs 832, 833 within its service area 830. The dashed arrow lines from the network node 831 to the UEs 832, 833 represent downlink (DL) communications to the UEs 832, 833. The solid arrow lines from the UEs 832, 833 to the network node 831 represent uplink (UL) communications.

In general, with reference to FIG. 8, the non-limiting term "user equipment" can refer to any type of device that can communicate with network node 831 in a cellular or mobile communication system 800. UEs 832, 833 can have one or more antenna panels having vertical and horizontal elements. Examples of UEs 832, 833 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 832, 833 can also comprise IOT devices that communicate wirelessly.

In various embodiments, system 800 comprises communication service provider network(s) 810 serviced by one or more wireless communication network providers. Communication service provider network(s) 810 can comprise a "core network". In example embodiments, UEs 832, 833 can be communicatively coupled to the communication service provider network(s) 810 via a network node 831. The network node 831 can communicate with UEs 832, 833, thus providing connectivity between the UEs 832, 833 and the wider cellular network. The UEs 832, 833 can send transmission type recommendation data to the network node 831. The transmission type recommendation data can comprise a recommendation to transmit data via a closed loop multiple input multiple output (MIMO) mode and/or a rank-1 precoder mode.

Network node 831 can have a cabinet and other protected enclosures, computing devices, an antenna mast, and multiple antennas for performing various transmission operations (e.g., MIMO operations) and for directing/steering signal beams. Network node 831 can comprise one or more base station devices which implement features of the network node. Network nodes can serve several cells, depending on the configuration and type of antenna. In example embodiments, UEs 832, 833 can send and/or receive communication data via wireless links to the network node 831.

Communication service provider networks 810 can facilitate providing wireless communication services to UEs 832, 833 via the network node 831 and/or various additional network devices (not shown) included in the one or more communication service provider networks 810. The one or more communication service provider networks 810 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 800 can be or comprise a large-scale wireless communication network that spans various geographic areas. According to this implementation, the one or more communication service provider networks 810 can be or comprise the wireless communication network and/or various additional devices and components of the wireless communication network (e.g., additional network devices and cell, additional UEs, network server devices, etc.).

The network node 831 can be connected to the one or more communication service provider networks 810 via one or more backhaul links 820. The one or more backhaul links 820 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 820 can also comprise wireless link components, such as but not limited to, line-of-sight (LOS) or non-LOS links which can comprise terrestrial air-interfaces or deep space links (e.g., satellite communication links for navigation). Backhaul links 820 can be implemented via a "transport network" in some embodiments. In another embodiment, network node 831 can be part of an integrated access and backhaul network. This may allow easier deployment of a dense network of self-backhauled 5G cells in a more integrated manner by building upon many of the control and data channels/procedures defined for providing access to UEs 832, 833.

Wireless communication system 800 can employ various cellular systems, technologies, and modulation modes to facilitate wireless radio communications between devices (e.g., the UEs 832, 833 and the network node 831). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 800 can operate in accordance with any 5G, next generation communication technology, or existing communication technologies, various examples of which are listed supra. In this regard, various features and functionalities of system 800 are applicable where the devices (e.g., the UEs 832, 833 and the network node 831) of system 800 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 800 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities. The terms "set" and "group" are used interchangeably herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G, O-RAN, or other generation networks, the disclosed aspects are not limited to 5G or O-RAN implementations, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data replication system, comprising:
at least one processor; and
at least one memory coupled to the at least one processor and having instructions stored thereon, wherein, in response to the at least one processor executing the instructions, the instructions facilitate performance of operations, comprising:
monitoring a data replication operation regarding storage of data at a first storage device and at a second storage device;
determining a recovery point objective (RPO) for the data replication at the first storage device and the second storage device;
comparing the RPO with a threshold; and
in response to determining that the RPO is less than the threshold, storing the data using synchronous (sync) replication concurrently, or near concurrently, at the first storage device and the second storage device, wherein the sync replication utilizes a first network path between the first storage device and the second storage device; or
in response to determining that the RPO is equal to, or greater than, the threshold, storing the data using asynchronous (async) replication, wherein the async replication utilizes a second network path between the first storage device and the second storage device, wherein the second network path comprises a memory buffer between the first storage device and the second storage device, wherein the data is first data configured to be stored at the first storage device and the second storage device, wherein the memory buffer is configured to temporarily store the first data to be written to the second storage device while second data is concurrently being written to the first storage device, and wherein the second data is received subsequent to receiving the first data at the first storage device.

2. The data replication system of claim 1, wherein the operations further comprise, in the event of async replication is currently being implemented, in response to a subsequent determination that the RPO is less than the threshold, re-implementing the sync replication.

3. The data replication system of claim 1, wherein the threshold is determined as a function of a time defined in a service level agreement applicable to the data replication system.

4. The data replication system of claim 1, wherein the operations further comprise:
identifying a future volume of data to be stored by the data replication system at a future time;
determining a future threshold implement sync-mode operation of the data replication system; and
at the future time, applying the future threshold to store the future volume of data with sync-mode replication.

5. The data replication system of claim 1, wherein the operations further comprise:
determining the RPO as a function of a time difference between writing a first copy of first data to the first storage device and writing a second copy of the first data to the second storage device.

6. The data replication system of claim 1, wherein the first storage device is located local to the data replication system and the second storge device is located remote from the data replication system.

7. The data replication system of claim 1, wherein the first storage device and the second storage device are included in a storage area network, a local area network, local wide area network, or a cloud-based computing network.

8. The data replication system of claim 1, wherein the second network path further comprises an async replication component located between the memory buffer and the second storage device, wherein the async replication component is configured with one or more threads, and wherein the one or more threads facilitate transfer of the first data from the memory buffer to the second storage device.

9. A computer-implemented method, comprising:
monitoring, by a device comprising at least one processer, a recovery point objective (RPO) value of a data replication system comprising a first data storage system and a second data storage system, wherein the data replication system is initially operating in a synchronous (sync)-replication mode, wherein first data is being written concurrently, or near concurrently, to the first data storage system and the second data storage system, and wherein the sync-replication utilizes a first network path between the first data storage system and second data storage system;
comparing, by the device, the RPO with a threshold value; and
in response to determining, by the device, that the RPO value equals or exceeds the threshold value, implementing, by the device, asynchronous (async)-mode replication to store second data to the first data storage system and the second data storage system, wherein the sync-replication utilizes a second network path between the first data storage system and the second storage system, wherein the second network path comprises a buffer, and wherein, during async-mode replication, data is temporarily stored in the buffer to address write latency between the first storage device and the second storage device, as a result of which a first write operation to the first storage device is unimpeded by a second write operation to the second storage device.

10. The computer-implemented method of claim 9, wherein the first data storage system is located local to the device and the second data storage system is located remote from the device.

11. The computer-implemented method of claim 10, wherein writing a first copy of first data to the local device requires at least a first duration and writing a second copy of the first data to the remotely located device requires at least a second duration, and wherein the RPO value is a function of a difference between the first duration and the second duration.

12. The computer-implemented method of claim 10, further comprising, in response to subsequently determining that the RPO value has become less than the threshold value, implementing, by the device, the sync-mode replication to store a first copy of second data to the first data storage system and to store a second copy of the second data to the second data storage system.

13. The computer-implemented method of claim 9, wherein, during sync-mode replication, data is written directly to the second storage device.

14. The computer-implemented method of claim 9, wherein the first data storage system and the second data storage system are included in a storage area network, a local area network, local wide area network, or a cloud-based computing network.

15. The computer-implemented method of claim 9, wherein the second network path further comprises an async replication component located between the buffer and the second storage device, and wherein the async replication component is configured with one or more threads configured to facilitate transfer of the first data from the buffer to the second storage device.

16. A computer program product stored on a non-transitory computer-readable medium and comprising machine-executable instructions, wherein, in response to being executed, the machine-executable instructions cause a system to perform operations, comprising:

initiating operation of a data replication system with synchronous (sync)-mode replication of data between a first storage device and a second storage device, wherein the sync-mode replication of data utilizes a first network path between the first storage device and the second storage device;

determining a current recovery point objective (RPO) based on a first duration applicable to writing a first copy of first data to the first storage device and a second duration applicable to writing a second copy of the first data to the second storage device;

comparing the current RPO with a defined threshold;

in response to determining that the current RPO is less than the defined threshold, maintaining sync-mode operation to write a first copy of second data to the first storage device and to write a second copy of the second data to the second storage device, and in response to determining the current RPO is equal to, or above, the defined threshold, implementing asynchronous (async)-mode operation to write a first copy of third data to the first storage device and to write a second copy of the third data to the second storage device, wherein the async-mode replication of data utilizes a second network path between the first storage device and the second storage device, and wherein the second network path comprises a memory buffer configured to temporarily store the second copy of the third data to be written to the second storage device while the first copy of the third data is concurrently bring written to the first storage device.

17. The computer program product according to claim 16, wherein the defined threshold is determined based on a percentage of a customer-defined value in a service level agreement received at the data replication system.

18. The computer program product according to claim 17, wherein the operations further comprise, during async-mode operation:

generating a list of data awaiting replication at the second storage device;

adding the second copy of the second data to the list;

monitoring operation of the second storage device; and in response to determining no write operation is currently being performed at the second storage device:

identifying the second copy of the second data present in the list;

retrieving the second copy of the second data from the first storage device; and writing the second copy of the second data to the second storage device.

19. The computer program product according to claim 16, wherein the first data storage device is located local to the system and the second data storage device is located remote from the system.

20. The computer program product according to claim 16, wherein the first storage device and the second storage device are included in a storage area network, a local area network, local wide area network, or a cloud-based computing network.

* * * * *